June 16, 1964     C. B. FITZ-WILLIAM     3,137,730
PRODUCTION OF ETHYLENEDIAMINE
Filed April 12, 1960
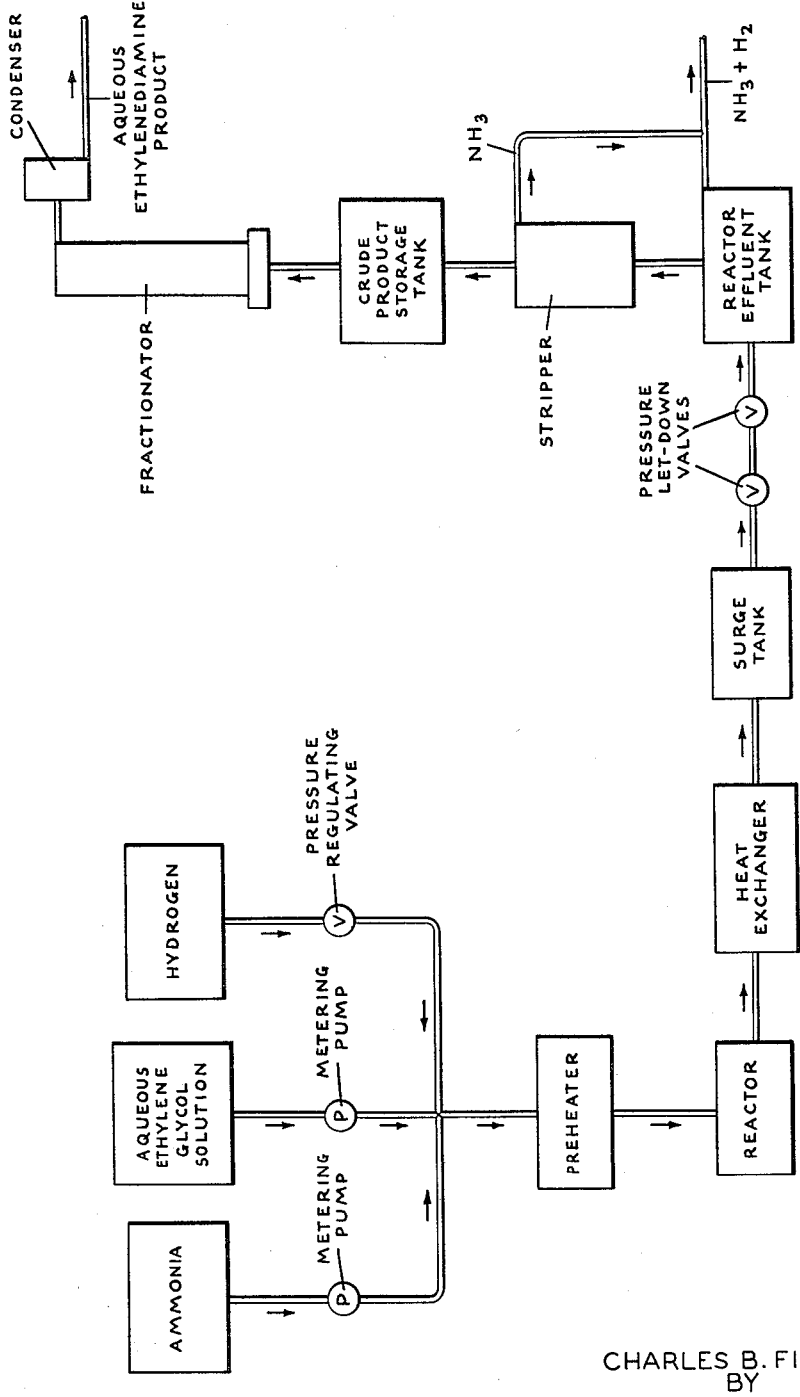
INVENTOR
CHARLES B. FITZ-WILLIAM
BY
*Ernest A. Polin*
ATTORNEY

3,137,730
PRODUCTION OF ETHYLENEDIAMINE
Charles B. Fitz-William, Richmond, Va., assignor to Allied Chemical Corporation, New York, N.Y., a corporation of New York
Filed Apr. 12, 1960, Ser. No. 21,685
6 Claims. (Cl. 260—585)

This invention relates to the production of ethylenediamine from ethylene glycol.

It is known that ethylenediamine can be produced by reacting ethylene dichloride and ammonia with the formation of ammonium chloride as by-product. This process, however, is objectionable from an economic standpoint since it involves conversion of valuable ethylene dichloride to a salt of low value. It is also known that ethylenediamine can be produced by reacting ethylene glycol and ammonia in the presence of a hydrogenation catalyst. However, attempts to produce ethylenediamine by this reaction have led to results lacking commercial interest. For example, as indicated in U.S. Patent 2,754,330, the reaction of ethylene glycol and ammonia at elevated temperature and pressure in the presence of a ruthenium catalyst fails to produce ethylenediamine in high yield but instead tends to form cyclic derivatives. Also, British patent specification 813,957 indicates that the reaction of ethylene glycol and ammonia at elevated temperature and pressure in the presence of hydrogen and a hydrogenation catalyst favors the formation of piperazine.

I have now found that ethylenediamine may be produced in high yield by reacting ethylene glycol and ammonia in the presence of a hydrogenation catalyst comprising nickel and copper under certain highly specific conditions.

It is, therefore, an object of my invention to provide an improved process for producing ethylenediamine in high yield from ethylene glycol. A further object of the invention is to provide an improved process for producing ethylenediamine in high yield by reacting ethylene glycol and ammonia in the presence of a hydrogenation catalyst comprising nickel and copper. Other objects will become apparent from the following description of the invention.

In accordance with my invention, ethylenediamine is produced in high yield by reacting ethylene glycol and ammonia, in liquid phase, at elevated temperature and pressure, in the presence of (1) hydrogen, (2) a hydrogenation catalyst comprising nickel and copper, and (3) water in amounts of about 30 to 300% by weight of the ethylene glycol. The ethylenediamine may then be separated from the resulting reaction mixture by any conventional procedure, as by fractional distillation.

Generally speaking, any catalyst comprising nickel and copper may be used as hydrogenation catalyst in the process of this invention. Thus, satisfactory results have been obtained using turnings of Monel alloy consisting essentially of 70% by weight of nickel and 30% by weight of copper. It is desirable that the catalyst be supported on a supporting material such as activated alumina, Alundum, clays, titania, charcoal, etc. Exceptionally high yields have been obtained in short reaction times using a catalyst consisting essentially of about 5 to 18% by weight of nickel and about 5 to 18% by weight of copper supported on activated alumina.

The presence of hydrogen is required in the process of the present invention. Although I do not wish to be limited by any theory, it is believed that the hydrogen activates the nickel-copper catalyst. An amount of hydrogen as little as about 0.2% by weight of the ethylene glycol is sufficient to obtain ethylenediamine in high yield; however, a larger proportion of hydrogen may be utilized if desired. Ordinarily there is no advantage, and it tends to become uneconomical, to employ more than about 10% of hydrogen by weight of the ethylene glycol.

Although as little as about 5 mols of ammonia per mol of ethylene glycol may be used in the process of this invention, especially outstanding results have been obtained using at least about 15 mols, and preferably about 20 to 30 mols, of ammonia per mol of ethylene glycol.

It is essential in achieving the desired results of the present process that a relatively large proportion of water be present. It is believed that the water serves to promote the desired reaction. Generally speaking, water is present in amount of about 30 to 300% by weight of the ethylene glycol. Especially outstanding results have been obtained using approximately equal weight ratios of water and ethylene glycol.

The process of this invention is carried out in liquid phase at elevated temperature and pressure. The reaction temperature may be between 200° and 300° C., but is preferably in the relatively narrow range of about 220° to 270° C. The process is desirably carried out at pressure above about 1000 pounds per square inch gauge, preferably from about 3000 to 6000 pounds per square inch gauge.

Space velocities of charge through the catalyst are generally in the range of about 6 to 20 hr.$^{-1}$, preferably about 10 to 15 hr.$^{-1}$. Reaction times are usually in the order of about 3 to 10 minutes.

By carrying out the reaction of ethylene glycol and ammonia under the above conditions, ethylenediamine is obtained as the principal reaction product, together with by-product piperazine in minor amounts and relatively small amounts of other by-products. The reaction mixture is obtained in the form of a liquid from which the desired ethylenediamine product can be readily separated, as by fractional distillation. The yields of ethylenediamine obtained are generally at least 45% of theoretical, based on the ethylene glycol consumed in the process.

The invention is more specifically described in connection with the accompanying drawing which is a graphic illustration of my preferred process.

Referring to the drawing, an aqueous solution (about 25 to 75%) of ethylene glycol, ammonia in ratio of about 20 to 30 mols per mol of ethylene glycol, and hydrogen in amount of about 0.2 to 10% by weight of the ethylene glycol are passed to a preheater. In the preheater, the mixture is heated to reaction temperature of about 220° to 270° C. at pressure of about 3000 to 6000 p.s.i.g. The preheated mixture is then passed at space velocity of about 10–15 hr.$^{-1}$ through a reactor containing a hydrogenation catalyst consisting essentially of about 5 to 18% by weight of nickel and about 5 to 18% by weight of copper supported on activated alumina.

After a reaction period of about 6 minutes, the effluent from the reactor is cooled to temperature of about 15° to 45° C. by passing it through a heat exchanger. The cooled effluent is next passed to a surge tank at reaction pressure. The effluent from the surge tank is led as mixed liquid-vapor via pressure let-down valves to a reactor effluent storage tank at atmospheric pressure. Hydrogen and ammonia are vented from the tank and may then be separated and recycled.

The aqueous solution of reactants and products is passed from the reactor effluent storage tank to a stripping column which is adapted to recover ammonia. The stripped ammonia vapor is combined with the vent stream from the reactant effluent storage tank. The deammoniated crude product is passed to a crude product storage tank and finally is distilled in a fractionating column equipped with a suitable reflux condenser to give the following fractions:

(1) Aqueous ethylenediamine product,
(2) Piperazine by-product,
(3) Unreacted ethylene glycol which is recycled, and
(4) High boiling fraction which is discarded.

The aqueous ethylenediamine may be dried by azeotropic distillation with an aromatic hydrocarbon such as benzene, the latter being non-azeotropic with respect to the ethylenediamine.

The invention is further illustrated by means of the following example in which parts are by weight:

Referring to the accompanying drawing, 810 parts of a 50% aqueous solution of ethylene glycol was charged to the preheater, together with 7 parts of hydrogen and 2975 parts of ammonia. This represented a ratio of 26.8 mols of ammonia to 0.54 mol of hydrogen to 1 mol of ethylene glycol. The preheater was operated at 250° C. and 4300 p.s.i.g. The preheated feed was then passed at space velocity of 12.8 hr.$^{-1}$ through the reactor which was packed with 184 parts of catalyst comprising 10 to 20 mesh activated alumina containing 12 weight percent of copper and 16 weight percent of nickel, prepared as described below:

A mixture of 475 parts of nickel nitrate and 396 parts of copper nitrate was melted in a rotating gas-fired stainless steel drum, and 408 parts of 10 to 20 mesh activated alumina was added. Heating was continued at a temperature of 400° to 800° C. until the nitrates were decomposed to oxides. Before use, the catalyst was screened to remove fines, and the oxides were reduced to nickel and copper by heating with hydrogen at 400° C. and atmospheric pressure.

After a reaction period of about 5 minutes, the reactor effluent was cooled to 30° C. The cooled effluent was passed through let-down valves to the reactor effluent storage tank where hydrogen and ammonia vapors were vented. The liquid phase from the tank was then freed of ammonia in the stripper.

The resultant crude reaction product was distilled into fractions in the fractionator to give 494 parts of aqueous ethylenediamine, 15.6 parts of piperazine and 250 parts of unreacted ethylene glycol. The aqueous ethylenediamine was then dried by azeotropic distillation with benzene to give 68.6 parts of relatively pure ethylenediamine product. Based on the amount of ethylene glycol consumed, this represented a yield of about 46% of theory.

It should be understood that the operation described above may be either batchwise or continuous.

Ethylenediamine finds utility in the synthesis of surface active and chelating agents, inhibitors, rubber accelerators, fungicides, insecticides, synthetic waxes, asphalt wetting agents and resinous polymers with formaldehyde.

Inasmuch as numerous embodiments of the present invention are apparent without departing from the spirit and scope thereof, the invention is not limited to the specific embodiment herein described, except as defined in the appended claims.

I claim:

1. A process for producing ethylenediamine which comprises reacting ethylene glycol and ammonia, in ratio of at least about 5 mols of ammonia per mol of ethylene glycol, in liquid phase, at temperature of about 200° to 300° C. and at pressure above about 1000 p.s.i.g., in the presence of (1) hydrogen in amount of at least about 0.2% by weight of the ethylene glycol, (2) a metal hydrogenation catalyst comprising about 5 to 18 parts by weight of nickel and about 5 to 18 parts by weight of copper, and (3) water in amount of about 30 to 300% by weight of the ethylene glycol, and separating ethylenediamine from the resulting reaction mixture.

2. A process for producing ethylenediamine which comprises reacting ethylene glycol and ammonia, in ratio of at least about 15 mols of ammonia per mol of ethylene glycol, in liquid phase, at temperature of about 200° to 300° C. and at pressure above about 1000 p.s.i.g., in the presence of (1) hydrogen in amount of at least about 0.2% by weight of the ethylene glycol, (2) a metal hydrogenation catalyst comprising about 5 to 18 parts by weight of nickel and about 5 to 18 parts by weight of copper, and (3) water in amount of about 30 to 300% by weight of the ethylene glycol, and separating ethylenediamine from the resulting reaction mixture.

3. A process for producing ethylenediamine which comprises reacting ethylene glycol and ammonia, in ratio at least about 15 mols of ammonia per mol of ethylene glycol, in liquid phase, at temperature of about 200° to 300° C. and at pressure above about 1000 p.s.i.g., in the presence of (1) hydrogen in amount of at least about 0.2% by weight of the ethylene glycol, (2) a metal hydrogenation catalyst consisting essentially of about 5 to 18% by weight of nickel and about 5 to 18% by weight of copper supported on activated alumina, and (3) water in amount of about 30 to 300% by weight of the ethylene glycol, and separating ethylenediamine from the resulting reaction mixture.

4. A process for producing ethylenediamine which comprises reacting ethylene glycol and ammonia, in ratio of about 20 to 30 mols of ammonia per mol of ethylene glycol, in liquid phase, at temperature of about 200° to 300° C. and at pressure above about 1000 p.s.i.g., in the presence of (1) hydrogen in amount of at least about 0.2% by weight of the ethylene glycol, (2) a metal hydrogenation catalyst consisting essentially of about 5 to 18% by weight of nickel and about 5 to 18% by weight of copper supported on activated alumina, and (3) water in amount of about 30 to 300% by weight of the ethylene glycol, and separating ethylenediamine from the resulting reaction mixture.

5. A process for producing ethylenediamine which comprises reacting ethylene glycol and ammonia, in ratio of about 20 to 30 mols of ammonia per mol of ethylene glycol, at temperature of about 200° to 300° C. and at pressure above about 1000 p.s.i.g., in the presence of (1) hydrogen in amount of about 0.2 to 10% by weight of the ethylene glycol, (2) a metal hydrogenation catalyst consisting essentially of about 5 to 18% by weight of nickel and about 5 to 18% by weight of copper supported on activated alumina, and (3) water in amount approximately the weight equivalent of the ethylene glycol, and separating ethylenediamine from the resulting reaction mixture by fractional distillation.

6. A process for producing ethylenediamine which comprises reacting ethylene glycol and ammonia, in ratio of about 20 to 30 mols of ammonia per mol of ethylene glycol, at temperature of about 220° to 270° C. and at pressure of about 3000 to 6000 p.s.i.g., in the presence of (1) hydrogen in amount of about 0.2 to 10% by weight of the ethylene glycol, (2) a metal hydrogenation catalyst consisting essentially of about 5 to 18% by weight of nickel and about 5 to 18% by weight of copper supported on activated alumina, and (3) water in amount approximately the weight equivalent of the ethylene glycol, and separating ethylenediamine from the resulting reaction mixture by fractional distillation.

References Cited in the file of this patent

UNITED STATES PATENTS

| | | |
|---|---|---|
| 2,225,059 | Lazier | Dec. 17, 1940 |
| 2,456,599 | Smith | Dec. 14, 1948 |
| 2,861,995 | MacKenzie | Nov. 25, 1958 |

FOREIGN PATENTS

| | | |
|---|---|---|
| 537,742 | Canada | Mar. 5, 1957 |